Patented June 22, 1937

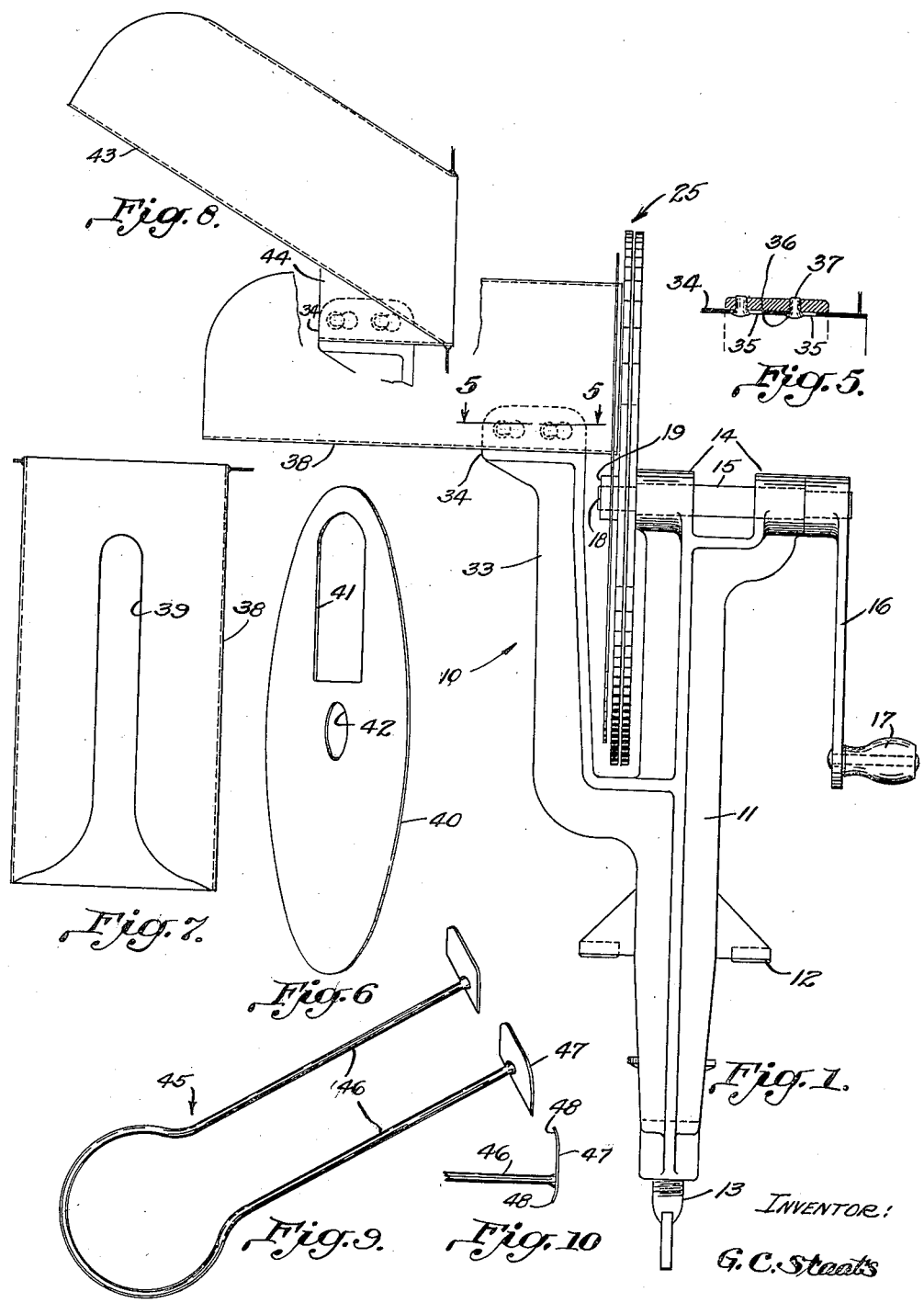

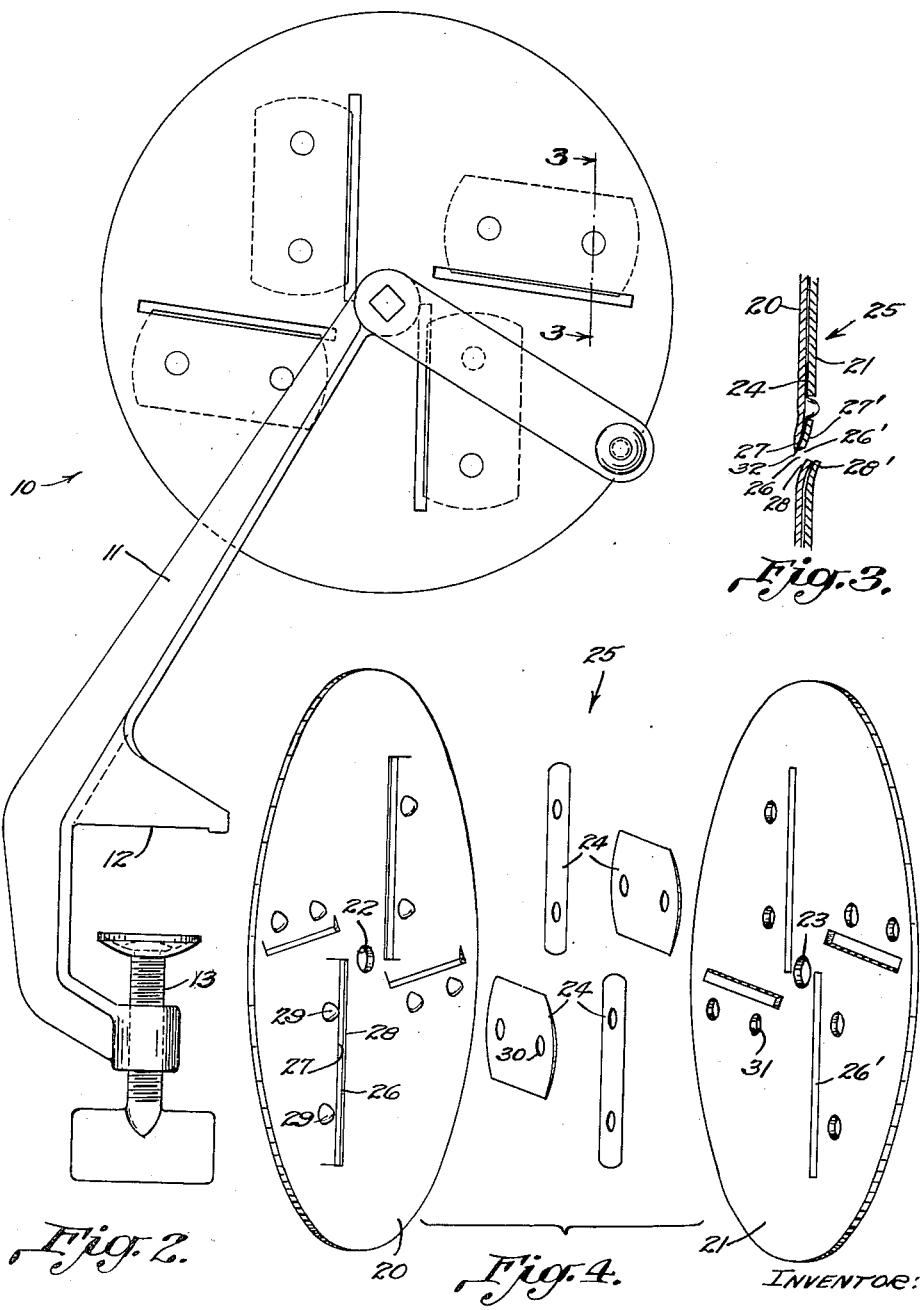

2,084,924

UNITED STATES PATENT OFFICE 2,084,924

FOOD CHOPPER

Gilson C. Staats, Folsom, Pa.

Application June 14, 1934, Serial No. 730,672

11 Claims. (Cl. 146—114)

This invention relates to a food chopper and has for an object to provide an improved food chopper or cutter especially useful for finely cutting such vegetables as green cabbage, lettuce, carrots, nuts or other materials to be used in making salads, etc., this food chopper being especially intended for use in the home, but being equally serviceable for use in delicatessens or restaurants or wherever salads are prepared in small or in large quantity. Food choppers of this general nature are usually not found in the home kitchen generally because of the fact that it is difficult if not impossible to properly sharpen the usual blade provided therewith and more especially because of the great expense usually attached with purchasing such a food chopper and keeping it in operation. This food chopper however may be manufactured and hence sold to the housekeeper at a low cost and may be kept in continual service without the necessity or expense of resharpening or purchasing new guides therefor, especially because of the fact that the knives or blades used in this chopper are generally old razor blades, which while too dull to serve their original purpose are extremely sharp and especially suitable for use in this chopper.

A further object of this invention is to provide means for chopping food or vegetables which will operate quickly and easily, which makes use of old safety razor blades, and further which provides a means of feeding the food or vegetables to the blades, which means at the same time makes it impossible for the operator to carelessly cut the fingers on any of the blades.

A further object of this invention is to provide a vegetable or food chopper which may be easily disassembled so as to be easily cleaned and made sanitary without much difficulty between each use thereof.

A further object of this invention is to provide a feed trough which may be either horizontal or angular in position for feeding the food or vegetables to the blade.

Still a further object of this invention is to provide a feeding fork especially adapted to cooperate with the feeding trough used in this invention and press the food or vegetables against the blade without any danger of catching in the blade or injuring the blade.

With the foregoing and other objects in view, as will hereinafter become apparent, this invention comprises the constructions, combinations and arrangements of parts, hereinafter set forth, disclosed and shown on the accompanying drawings.

In these drawings,

Figure 1 is an elevational view of the food chopper,

Figure 2 is a side elevational view of Figure 1 looking at the right side thereof, Figure 3 is a section on line 3—3 of Figure 2, Figure 4 is an exploded view of the knife or blade assembly, Figure 5 is a section on line 5—5 of Figure 1, Figure 6 is a perspective view of the knife or blade guard, Figure 7 is an elevational view of the horizontal feed trough, Figure 8 is an elevational view of an angular feed trough, Figure 9 is a perspective view of a feeding fork, and Figure 10 is an elevational view of a feeding fork pad.

The food chopper 10 constituting this invention includes an angular bracket 11 having a clamp 12 formed at the bottom thereof for cooperating with a clamp screw 13 for attaching the food or vegetable chopper to a ledge or edge of a table or other suitable support. At its upper end the bracket 11 is provided with a pair of spaced bearing members 14 through which is rotatably supported a shaft 15 to one end of which is keyed or splined a crank 16 having an operating handle 17. The other end of the shaft 15 terminates in a threaded neck 18 adapted to receive a nut 19 for securely affixing thereto a pair of discs 20 and 21, each disc 20 and 21 being provided with a central aperture 22 and 23 to just fit over the threaded neck 18.

As shown in Figure 4 the discs 20 and 21 in cooperation with a plurality of knives or blades 24 form a blade assembly 25. As shown, there are four blades or knives 24, but any suitable number from one or more may be provided. These blades or knives 24 are preferably in the form of safety razor blades of the double edge type and when used in this form may be inexpensively and cheaply replaced as soon as the edges dull or wear out.

The disc 20 is provided with a plurality of elongated apertures 26 having one lip 27 bent away from the plane of the disc 20, and the other lip 28 bent in the opposite direction from the plane of the disc 20. A pair of blade holding bosses 29 are provided adjacent the elongated opening 26 to cooperate with the conventional apertures 30 present in the blades 24, the bosses 29 then being received in the apertures 31 cooperating therewith in the disc 21. This disc 21 is provided with similar elongated openings 26' having similar lips 27' and 28' projecting beyond the plane of the disc 21.

As shown in Figure 3, the lips 27 and 27' cooperate to hold the blade edge 32 curved slightly beyond the plane of the blade assembly 25, so that the blade edge 32 will cut any food or vegetables held against the surface of the disc 20 as the blade assembly 25 is rotated by the crank 18 and handle 17, and will then cause the cut off portions of the food or vegetables to pass through the cooperating openings 26 and 26' and be discharged on the other side of the other disc 21, a convenient receptacle, such as a plate or dish, being placed below the food chopper to receive the cuttings.

In order to feed the vegetables or food to the knife blade assembly 25 without danger of cutting the fingers, the bracket 11 is provided with an extending supporting arm 33 having an upstanding flange 34 in which are provided a pair of slots 35 to slidably receive the heads 36 of a pair of securing members 37 of a feeding trough 38. This feeding trough 38 is adapted to receive the food or vegetables therein and is shaped as shown in Figure 7, being somewhat cylindrical in form and provided with a slot 39, which stops short of the knife blade assembly end thereof thereby preventing the fingers from extending entirely into the trough 38 and preventing the possibility of cutting the fingers on the knife blade assembly.

A disc shaped guard 40 has an opening 41 of a shape corresponding to the shape of the trough 38 so that it may be press fitted over the end thereof and be held in position thereby. A central aperture 42 somewhat larger than the maximum diameter of the nut 18 allows a guard 40 to be put in position over the nut 18 without interfering with the rotation of the shaft 15, and thereby allows the guard 40 to be held close against the cutting side of the blade assembly 25 and prevents the possibility of accidentally cutting one's self against the knife or blade edges 32 during their rotation.

As shown in Figure 1 this trough 38 is horizontal when in operating position, but if desired a somewhat angular or sloping trough 43 may be substituted therefor, this sloping trough being provided with a depending flange 44 so that it may be secured to the flange 34 of the supporting arm 33 in an identical manner. To assist in pressing the food through the trough 38 or 43, a feeding fork 45 is provided, this feeding fork 45 consisting of a bent over member 46 each end terminating in a pad 47, the pad 47 being substantially at right angles to the end 46 somewhat like the hoe. The edges 48 of the pad 47 are curved backwards somewhat a distance greater than the amount that the knife blades 32 project beyond the plane of the disc 20 so that it will be impossible for the knife edge 32 to catch behind the pads 47 as the feeding fork presses the last bit of food through the trough 38 or 43.

In operation, the blades 24 are placed between the discs 20 and 21 which are then assembled in position by means of the nut 18 on the shaft 15. The trough 38 is placed on its supporting arm 33 and the chopper 10 secured to any suitable table or other ledge. The food or vegetables are pressed through the trough 38 by means of the feeding fork 45 as above described. In order to clean the food chopper it is quickly disassembled by removing the trough from the supporting arm 33 and removing the knife assembly 25 from the shaft 15 allowing the entire device to be quickly and easily sterilized and cleaned and put away to await its next use. When the blades get dull they may be reversed in position and when both edges are used up other safety razor blades may be quickly and easily substituted therefor.

As will be obvious, safety razor blades that are too dull for use in a safety razor are still more than sufficiently sharp for use in this food chopper so that new blades may be supplied for the chopper as often as is necessary by merely making use of discarded safety razor blades present in every household whose disposal is often a problem.

The novel features and the operation of this device will be apparent from the foregoing description. While the device has been shown and the structure described in detail, it is obvious that this is not to be considered limited to the exact form disclosed, but that changes may be made therein within the scope of what is claimed without departing from the spirit of the invention.

Having thus set forth and disclosed the nature of this invention, what is claimed is:

1. A food chopper comprising a supporting bracket, bearing means formed on said bracket, a rotatable shaft supported in said bearing means, a crank handle secured to one end of said rotatable shaft, cutting means secured to the other end of said rotatable shaft, said rotatable cutting means comprising a pair of discs, and knife blade means secured by said pair of discs therebetween and having knife edge means substantially within the periphery of said discs and extending beyond the plane of said discs.

2. A food chopper comprising a supporting bracket, bearing means formed on said bracket, a rotatable shaft supported in said bearing means, a crank handle secured to one end of said rotatable shaft, cutting means secured to the other end of said rotatable shaft, said rotatable cutting means comprising a pair of discs, and knife blade means secured by said pair of discs therebetween and having knife edge means substantially within the periphery of said discs and extending beyond the plane of said discs, said discs having aligned opening means therethrough adjacent said knife blade edge means.

3. For use in a food chopping means having a rotatable cutting means and a feeding trough secured adjacent thereto; a feeding fork adapted to push food through said feeding trough, said feeding fork comprising a substantially U-shaped member, the bight of the U being curved to provide a handle and an individual pad secured to each leg of said U-shaped member at right angles thereto.

4. For use in a food chopping means having a rotatable cutting means and a feeding trough secured adjacent thereto; a feeding fork adapted to push food through said feeding trough, said feeding fork comprising a substantially U-shaped member, the bight of the U being curved to provide a handle and an individual pad secured to each leg of said U-shaped member at right angles thereto, each pad being substantially curved in cross section.

5. In a food cutter, a rotatable cutting assembly comprising a pair of discs and knife blade means secured by said discs therebetween, and having knife edge means substantially within the periphery of said discs and extending beyond the plane of said discs.

6. In a food cutter, a rotatable knife blade assembly, a pair of discs having one or more aligned elongated apertures extending therethrough, the lips on said apertures of said discs being curved in opposite directions out of the plane of said discs, and knife means secured between said discs and having their knife edges extending beyond one pair of aligned lips of said apertures.

7. In a food cutter, a rotatable knife blade assembly, a pair of discs having one or more aligned elongated apertures extending therethrough, the lips on said apertures of said discs being curved in opposite directions out of the plane of said discs, and knife means secured between said discs and having their knife edges extending beyond one pair of aligned lips of said apertures, said knife means comprising safety razor blades.

8. In a food cutting machine, a rotatable cutting assembly comprising a pair of complementary discs, and a plurality of safety razor blades, each of said discs having a plurality of aligned elongated apertures therein, elongated lips on opposite sides of said apertures, said lips being bent out of the plane of said discs, and means securing said safety razor blades between said discs with their cutting edge extending between one of the elongated lips of each disc.

9. In a food cutting machine, a rotatable cutting assembly comprising a pair of complementary discs, and a plurality of safety razor blades, each of said discs having a plurality of aligned elongated apertures therein, elongated lips on opposite sides of said apertures, said lips being bent out of the plane of said discs, and means securing said safety razor blades between said discs with their cutting edge extending between one of the elongated lips of each disc, said lips of each aperture between which said knife blade edge extends being bevelled toward said knife blade edge.

10. In a food cutting machine, a rotatable cutting assembly comprising a pair of complementary discs, and a plurality of safety razor blades, each of said discs having a plurality of aligned elongated apertures therein, elongated lips on opposite sides of said apertures, said lips being bent out of the plane of said discs, means securing said safety razor blades between said discs with their cutting edge extending between one of the elongated lips of each disc, said safety razor blade securing means comprising a pair of projecting bosses formed on one of said discs, and a pair of aligned openings formed on the other of said discs.

11. A food chopper comprising an angularly inclined bracket, a clamping means for securing said bracket to a suitable ledge, a pair of spaced shaft bearings formed in said bracket, a shaft rotatably supported in said shaft bearings, a crank handle secured to one end of said shaft, a knife blade assembly secured to the other end of said shaft, said knife blade assembly comprising a pair of discs and a plurality of safety razor blades secured between said discs, said discs having aligned elongated apertures, and bent lips along said apertures extending beyond the plane of said discs, said safety razor blades being secured between said discs with their cutting edges extending beyond said bent lips, said cutting edges of said blades being on the opposite sides of said knife blade assembly from said crank handle, and nut means on said rotatable shaft holding said discs and blades together in assembled position on said shaft, an extension arm on said bracket extending to the cutting side of said knife blade assembly, and feeding means detachably secured to said extension arm adjacent said cutting edges.

GILSON C. STAATS.